United States Patent [19]

Harvey et al.

[11] Patent Number: 5,553,415
[45] Date of Patent: Sep. 10, 1996

[54] BURNERS

[75] Inventors: Adrian M. Harvey, Shoreham-by-Sea; Christopher J. Harvey, Uckfield; Philip K. Bush, Halstead, all of United Kingdom

[73] Assignee: Harvey Bush Ltd., United Kingdom

[21] Appl. No.: 199,209

[22] PCT Filed: Jul. 1, 1993

[86] PCT No.: PCT/GB93/01414
§ 371 Date: Feb. 28, 1994
§ 102(e) Date: Feb. 28, 1994

[87] PCT Pub. No.: WO94/01723
PCT Pub. Date: Jan. 20, 1994

[30] Foreign Application Priority Data

Jul. 1, 1992 [GB] United Kingdom ............ 9213949

[51] Int. Cl.⁶ .................................................. A01M 15/00
[52] U.S. Cl. ..................................... 47/1.44; 47/1.42
[58] Field of Search ............................ 47/1.44, 1.42, 47/DIG. 10

[56] References Cited

U.S. PATENT DOCUMENTS

| | | | |
|---|---|---|---|
| 2,523,953 | 9/1950 | Johnson | 47/1.44 |
| 2,682,728 | 7/1954 | Nisbet et al. | 47/1.42 |
| 2,858,755 | 11/1958 | Toulmin, Jr. | 47/1.42 |
| 3,802,020 | 4/1974 | Stone et al. | 47/1.42 |
| 4,239,030 | 12/1980 | Benson | 47/1.44 |
| 4,420,901 | 12/1983 | Clarke | 47/1.42 |

*Primary Examiner*—Terry Lee Melius
*Assistant Examiner*—Joanne C. Downs
*Attorney, Agent, or Firm*—Lucas & Just

[57] ABSTRACT

There is described a burner for vegetable matter such as straw or the like, comprising a combustion chamber (9) having an upstream and a downstream end, a blower (6) discharging air and cut vegetable matter into the upstream end of the combustion chamber, an igniter (10) positioned at the upstream end of the combustion chamber, and a number of screens (14, 15, 16) extending across the combustion chamber and spaced from each other in the flow direction, the mesh size of the screens decreasing in the flow direction. The burner is used, inter alia, in a soil steriliser and stubble burner which comprises a chassis, a pick-up device (1) to collect a swath of vegetable-matter from the ground, a feed device (2, 3, 4) to feed the vegetable matter to a chopper (5) and a blower to transport the vegetable matter to the upstream end of the combustion chamber of the burner, the combustion gases from the burner being directed via a discharge device (11) onto the surface of the ground.

19 Claims, 4 Drawing Sheets

BURNERS

The present invention relates to burners and is particularly concerned with burners using vegetable matter as a fuel.

It has long been a problem in agriculture to dispose of straw left after the harvesting of cereal crops. The principal methods of disposal currently used in agriculture are removal by baling, and ploughing to incorporate the stubble into the soil. Stubble burning, a method preferred by farmers has been under attack for some time on ecological grounds due to the smoke pollution caused, and more recently a ban on stubble burning has been introduced. Straw incorporation by ploughing has disadvantages in that as well as being relatively expensive, any diseases in the straw are left in the field, and can affect the following season's crop.

It has been previously proposed in agriculture to use straw as a fuel in a burner for heating the surface of the soil in order to dispose of the straw and to control weeds. The disadvantage of previous attempts to sterilize large acreages by the use of heat has been that the penetration of the heat into the soil is insufficient to effect a complete sterilisation of the soil and thus an effective control of weeds.

The present invention seeks to provide a burner through the complete combustion of vegetable matter such as straw, can effectively sterilise large acreages of soil and thus reduce the need for chemical agents to control such pests.

A secondary objective of the invention is to provide a straw burner which extracts the maximum possible amount of energy from straw by combustion, and can be incorporated into a boiler arrangement to provide heating and/or electricity.

A further objective of the invention is to provide an agricultural soil steriliser capable of moving across an area of land and effectively sterilizing the soil by causing heat to penetrate more deeply into the soil than has hitherto been the case.

According to a first aspect of the present invention, a burner for vegetable matter such as straw or the like, comprises a combustion chamber having an upstream and a downstream end, a blower discharging air and cut vegetable matter into the upstream end of the combustion chamber, an igniter positioned at the upstream end of the combustion chamber, and a number of screens extending across the combustion chamber and spaced from each other in the flow direction, the mesh size of the screens decreasing in the flow direction.

Preferably, the screens are so arranged that the total area of the openings in each screen is greater than the area of the openings in the adjacent upstream screen, and the blower is a combined chopper and blower, serving to comminute the vegetable matter and transport it entrained in a current of air into the combustion chamber.

According to a second aspect of the present invention, a soil steriliser and stubble burner comprises a chassis, a pick-up device to collect a swath of vegetable matter from the ground, a feed device to feed the vegetable matter to a chopper and a blower to transport the vegetable matter to the upstream end of the combustion chamber of a burner, the combustion gases from the burner being directed via a discharge device onto the surface of the ground.

Preferably the vegetable matter is cut in a first chopper to lengths of about 100 mm, and is chopped in a second chopping stage to lengths of about 30 mm prior to being transported to the burner.

Embodiments of the invention will now be described in detail with reference to the accompanying drawings, of which:

Figure 1:
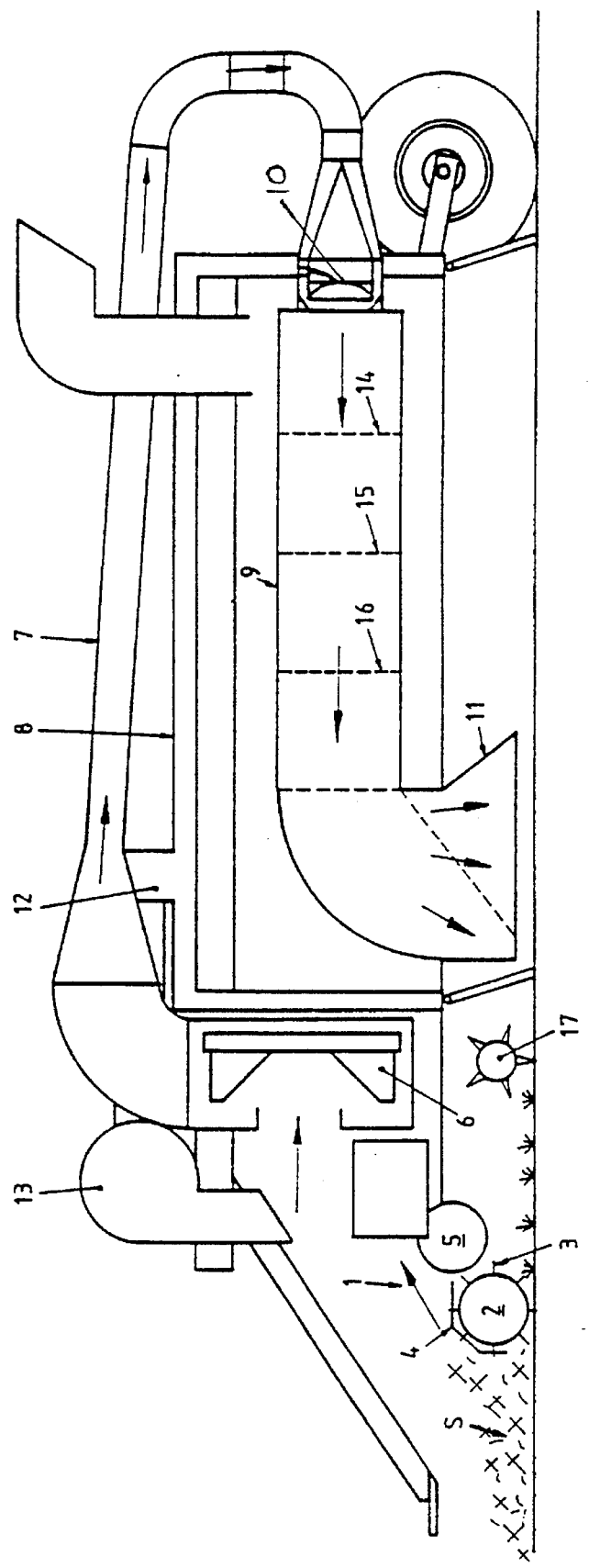
FIG. 1 is a schematic longitudinal vertical section through a soil-sterilising apparatus.
Figure 2:
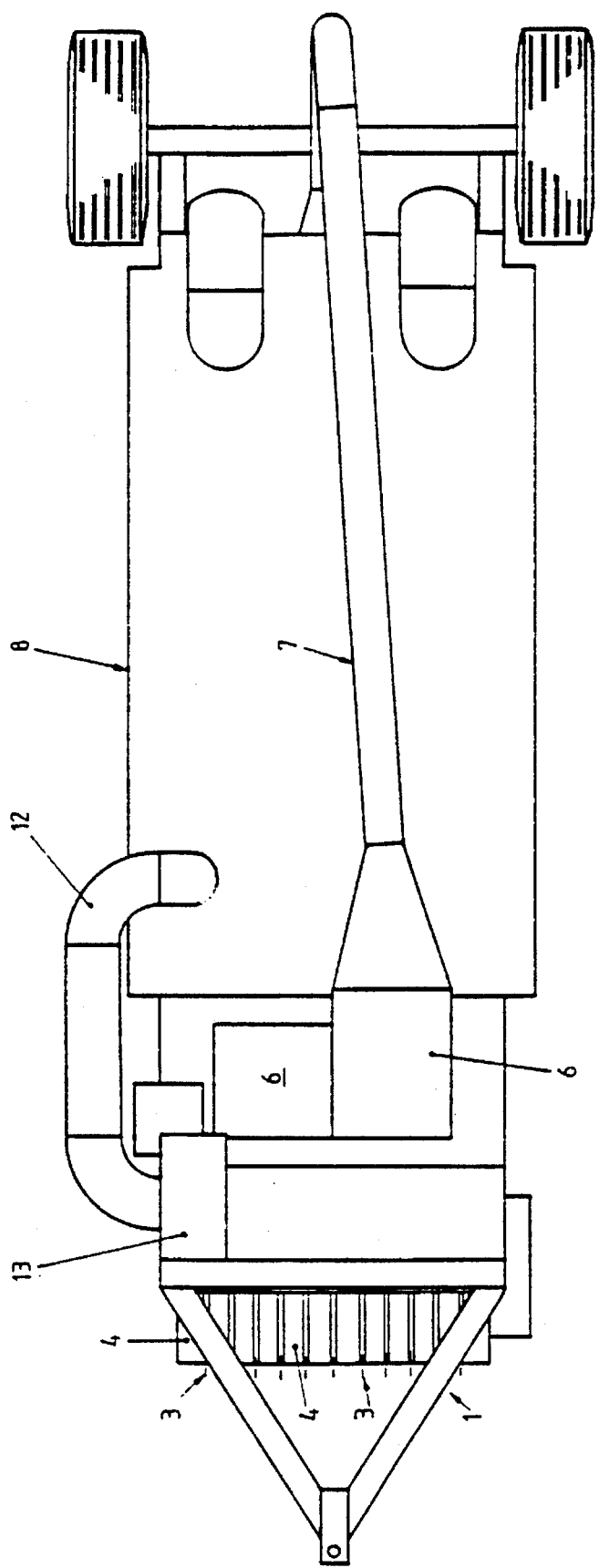
FIG. 2 is a schematic plan view of the apparatus.

Referring now to FIGS. 1 and 2, the apparatus shown is a soil sterilising device intended to be drawn behind an agricultural tractor in the direction of arrow A. The apparatus comprises at its leading end a straw pick-up device 1 comprising a pick-up reel 2 with tines 3 moving in slots in a pick-up table 4. The pick-up device may include a cutter to deal with standing straw after a cereal crop has been harvested by a harvester using a stripper head rather than by a conventional combine harvester.

Straw, or other cut vegetable matter, which may be lying on the ground after cutting, or may have been placed on the ground to be treated is picked up by tines 3 of a pick-up reel and lifted into the reach of a primary chopper/feeder 5, which coarsely chops the cut matter and then deposits it into the inlet of a secondary chopper/blower 6. Preferably, the straw is roughly cut to lengths between 20 and 100 mm in the primary chopper/feeder 5, but the pick-up reel may operate with uncut straw up to 600 mm in length. In the chopper/blower 6, the straw is reduced to a uniform size of approximately 60 mm lengths.

For the purposes of description, the term 'cut straw' should be considered to include any vegetable matter suitable for use as fuel. From the chopper/blower 6, comminuted straw is transported on a current of air through a feed duct 7 over the main body 8 of the apparatus, and is then blown into a combustion chamber 9 situated inside the body 8 of the apparatus. The body 8 is a downwardly-open double-skinned hollow shell, within the inner skin of which the horizontal cylindrical combustion chamber 9 is supported. At the upstream end of the combustion chamber 9, the duct is connected to a conical divergent section having a conical centre body so arranged that the cross-sectional area between the conical duct portion and the centre body is substantially constant in the flow direction. An igniter burner 10 is positioned at the downstream end of the centre body, and the duct at this point is provided with a conical convergent skirt to accelerate the flow as it is discharged into the combustion chamber. This burner is a conventional burner for liquid fuel, and preferably uses diesel oil as its fuel. The ignition jet burner will preferably be fed from a low pressure supply system from a feeder tank, the fuel being drawn through a high micron filter assembly into a fuel pump. The fuel is pumped to a solenoid valve, from whence it will either pass to the burner, or back to the feeder tank via a fuel return line. The fuel line between the pump and the solenoid valve is preferably provided with a pressure relief valve. The purpose of the burner is to ignite the mixture of air and cut straw as it enters the combustion chamber. When the temperature in the combustion chamber reaches a point where spontaneous combustion of the straw occurs, and thus a self-sustaining combustion of straw is achieved in the combustion chamber, the fuel supply to the burner 10 is reduced or stopped. Preferably, a thermostat control circuit is provided for the burner 10, so that its fuel supply is regulated to maintain a constant temperature in the combustion chamber.

At its downstream end, the combustion chamber may have one of two alternative configurations. When the apparatus is to be used to burn off stubble in a field harvested using a conventional combine harvester, the combustion chamber is provided with a downwardly directed bell end 11 which is situated near ground level to direct the hot blast from the combustion chamber on to the soil surface. The bell end 11 has a width slightly less than the width of the body 8, so that an air gap is maintained round the combustion chamber and bell end. The bell end preferably includes skids at its sides which run over the ground and seal the sides of the bell end. At the front and rear edges of the bell end 11, hinged flaps contact the ground at their lower edges to effect a seal and direct the hot blast into the soil.

When the apparatus is to be used for soil sterilisation, the bell end 11 is replaced by chamber having a transversely-extending downwardly directed slotted opening (seen in phantom lines in the embodiment of FIGS. 3 and 4) which directs a wide high-velocity jet of hot gas and flame downwards onto the soil surface. The effect of this high-velocity jet is to disturb the soil surface and cause soil particles to be blown about within the inner skin of the body 8, where the heat is effective to sterilise the soil. Advantageously, the speed of the jet exiting from the slot is such that approximately 100 mm of the soil surface is blasted into circulation within the inner skin of the body 8, the sterilised particles gradually settling back onto the surface as the body 8 moves forward over the ground.

Air from within the space between the inner and outer skins of the body 8, heated by contact with the outside surfaces of the inner skin, is drawn into a duct 12 by a second blower 13 and is directed onto the stream of cut straw prior to its entry into chopper/blower 6. The heated blast from blower 13 is directed generally towards the inlet of the chopper/blower 6, and serves to dry the cut straw and reduce the temperature of the outer skin. A significant part of the hot blast is drawn into the chopper/blower 6, so that the air in duct is pre-heated and continues to warm and dry the cut straw until it is discharged into the combustion chamber 9. By recirculating air from within the body 8, efficiency is enhanced and the production of free airborne dust is minimised.

As an alternative to drawing air from within the space between the inner and outer skins of the body 8, air may be drawn from the atmosphere through ducts heated by the body 8, to be fed to blower 13. These ducts may be in heat transfer contact with the outside of body 8, or may pass through body 8 so that heat may enter the incoming air through the duct walls. An exhaust duct will be required to release heated air from within the body 8, and further heat exchangers may be arranged in the exhaust duct to recover heat energy and increase efficiency. The area of the exhaust duct, or the total flow area of the exhaust ducts, is preferably approximately equal to four times the flow cross-sectional area at the combustion chamber exit. To reduce airborne dust emissions, dust separators or filters may be provided in the exhaust duct or ducts, and these may be in the form of filter meshes or cyclone separators.

Within the combustion chamber 9 are a number of transversely-arranged grids 14, 15 and 16. The grids are graduated in mesh size, the downstream grids 15 and 16 having a finer mesh than the upstream grid 14. The purpose of the grids is to arrest the movement of unburnt particles, maintaining them in the combustion chamber 9 until they are completely burnt and ensuring even combustion along the length of the combustion chamber. As larger particles impinge on the upstream grid 14, they are held and continue to burn. Eventually they reach a size which passes through the grid, and they are carried by the heated blast to the next grid, where they are again held until they reach a size capable of passing through. After exiting the final grid, the straw is substantially completely burned and all its heat energy is released. In an advantageous embodiment, the first grid 14 is comprised of 12.5 mm thick stainless steel rods arranged at 50 mm intervals to create a mesh of square openings each approximately 38 mm square. The second grid 15 is a wire mesh with openings approximately 25 mm square, and the third grid is a perforated plate having 6 mm diameter circular openings spaced by 12 mm lands.

It is foreseen that more than three grids may be provided, with the size of the openings progressively decreasing in the downstream direction of the combustion chamber. The grids in the combustion chamber are arranged so that the total open area of each grid is slightly greater that the open area of the previous grid, although each individual opening in the grid is smaller than each individual opening of the previous grid. The total open area in the last grid at the downstream end of the combustion chamber is adjusted so as to maintain a predetermined pressure level in the combustion chamber, so that complete combustion of the straw is ensured. As a further refinement, pressure relief vent openings may be provided in the wall of the combustion chamber 9 to prevent internal pressure building up as a result of blockage of the grids by unburnt straw. The hot blast from the combustion chamber is then directed onto the soil surface over which the bell end 11 is passing.

In order to maximise penetration of heat into the soil during soil sterilising operations, the apparatus may include a soil working tool 17 to loosen the upper layer of soil prior to the passage of the body 8 thereover. Any conventional arrangement may be used, for example a fixed tine harrow or a powered rotary tool.

To closely control the sterilising process, the temperatures reached under the bell end 11 and/or under the body 8 may be sensed and displayed. This will allow the speed of advance of the apparatus to be controlled so that effective soil heating is achieved.

As a safety feature, the downstream end of the combustion chamber may be provided with a deflector flap to enable the heated blast to be directed upwardly within the body 8, rather than downwardly onto the ground. This will enable selected areas of ground to be left untreated as the apparatus moves across them, and can be coupled with sensing devices at the leading edge of the body to deflect the blast upwardly should any person or undesired object fall into the path of the apparatus.

In operation, the device is towed over the ground to be sterilised, whereon a swath of straw is lying. The straw swath may be left from a combine harvesting operation, or may be previously laid down by unrolling cylindrical straw bales to form a strip of cut straw. As the device passes along the swath, the straw is picked up by the pick-up reel and fed to the choppers and blower. When the device reaches the end of the row to turn, the supply of straw is temporarily interrupted and the combustion jet temperature will fall. This initiates the ignition Jet sequence to maintain the predetermined temperature until the supply of straw is resumed.

To enable larger acreages to be treated, the steriliser apparatus may have the width of its bell end 11 arranged to be substantially equal to the width of the body 8. This will allow several such units to be secured together, and thus a wider strip of soil will be treated at each pass.

Figure 3:
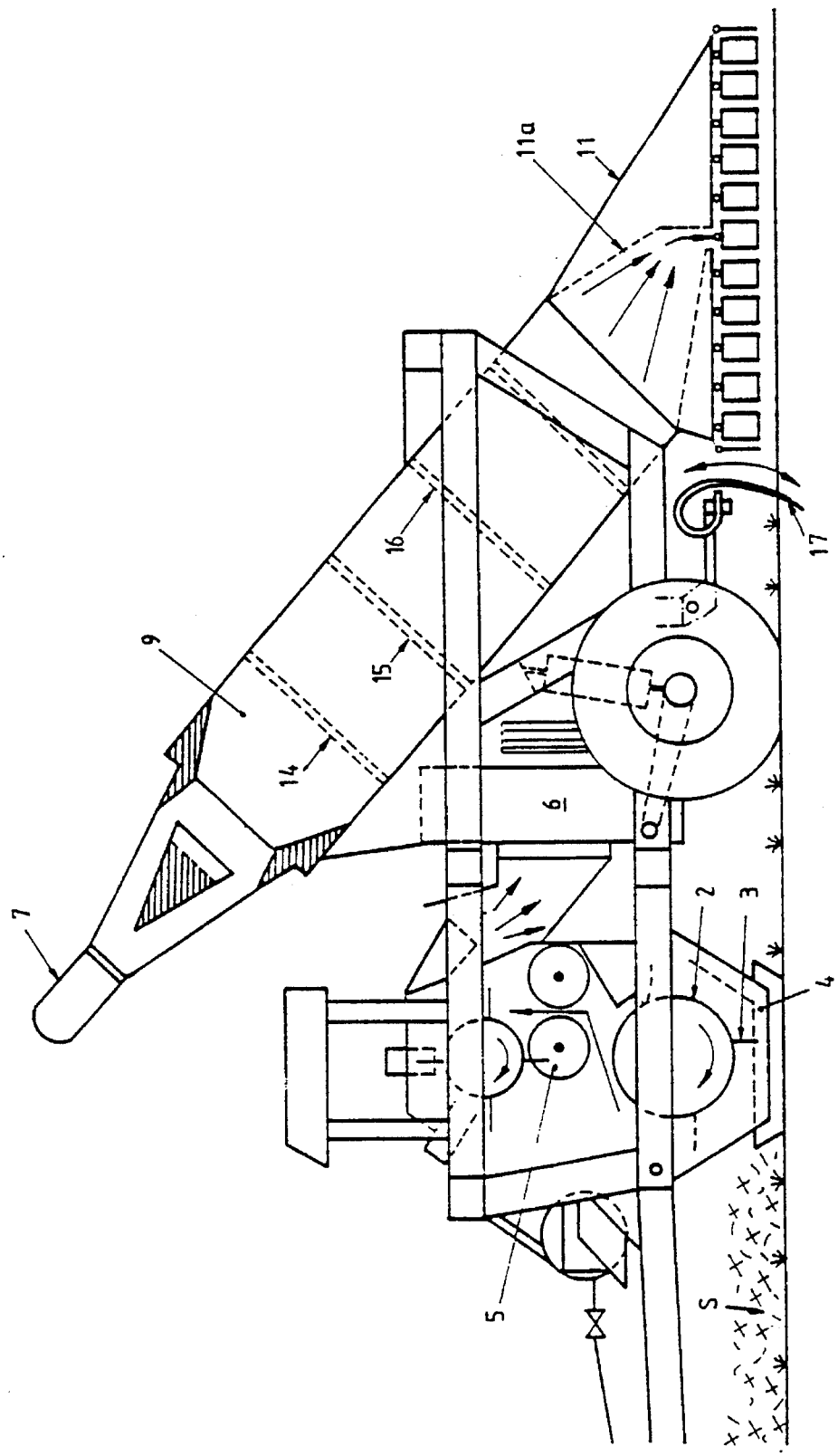
FIG. 3 is a side view of a second embodiment of the apparatus.
Figure 4:
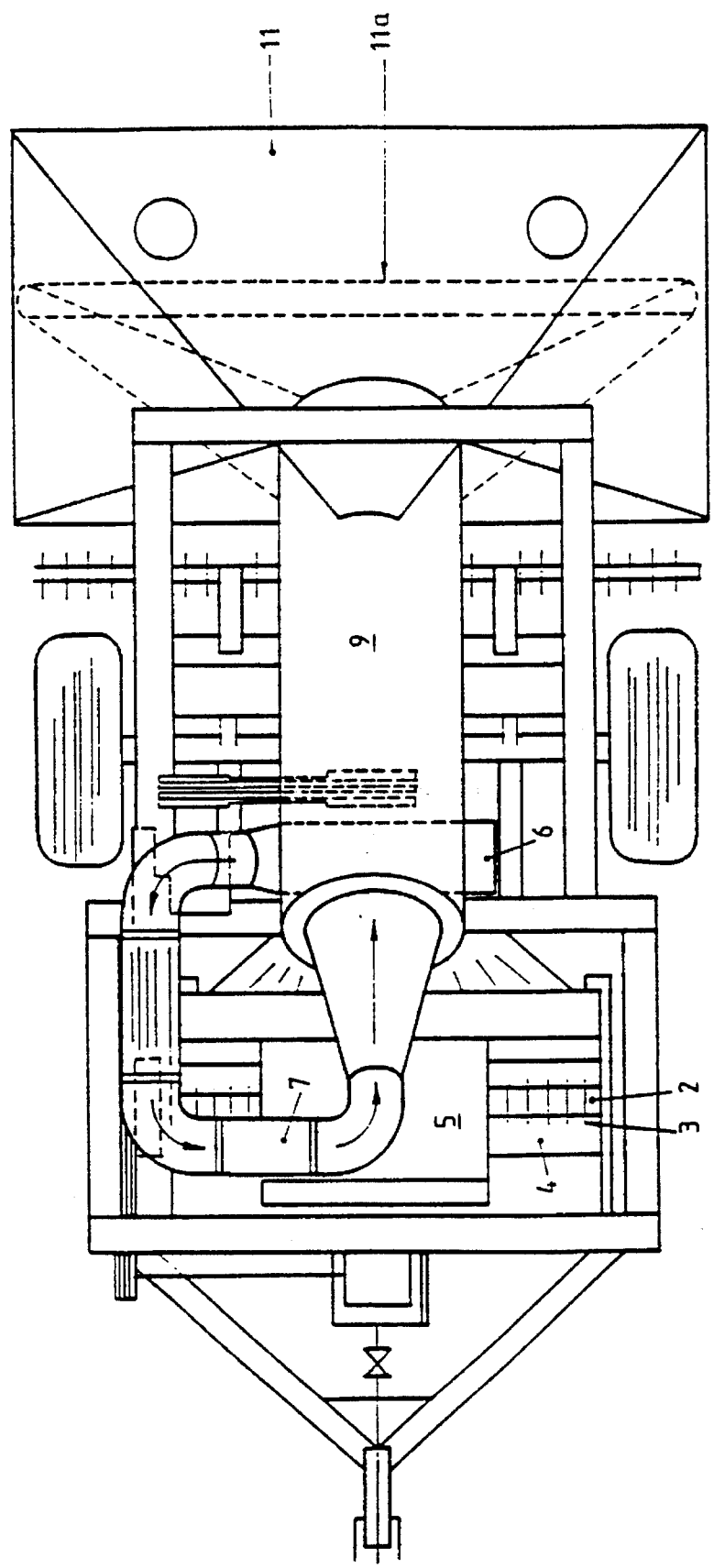
FIG. 4 is a plan view of the embodiment shown in FIG. 3.

In the embodiment shown in FIGS. 3 and 4, components and sub-assemblies corresponding to parts described with reference to FIGS. 1 and 2 have been given like reference numbers. In the embodiment seen in FIGS. 3 and 4, the overall length of the device is shortened by inclining the combustion chamber 9 at an angle of approximately 30° to the horizontal. The forward, upstream, end of the combustion chamber 9 is positioned substantially over the chopper/ blower 6, while the downstream end leads into a bell end 11 directing the flow onto the ground. An alternative configuration for the bell end is shown in dashed lines at 11a, this arrangement having a transverse discharge slot extending across substantially the entire width of the apparatus. This arrangement provides a high velocity "curtain" of hot gases directed onto a small area of soil, dislodging the surface layer and carrying the soil up into the body 8. The body 8 seen in FIGS. 1 and 2 surrounding the bell end 11 is omitted from FIGS. 3 and 4 for clarity, but is nevertheless present in the apparatus shown in FIGS. 3 and 4 to surround the bell end 11 or 11a.

Immediately preceding the body 8 and bell end 11 is a soil working tool in the form of a spring-tine harrow 20, which loosens the soil to facilitate heat penetration. In the apparatus of FIGS. 3 and 4 where the bell end 11a is used, the soil working tool precedes the body 8, and the bell end 11a is positioned midway between the leading and trailing ends of the body 8. With this arrangement, surface stubble is exposed to the interior of the body 8 for a time prior to exposure to the blast from the bell end 11a, thus giving time for surface stubble to be burned off before the soil is dislodged by the blast from the bell end 11a. After the bell end 11a has passed, the disturbed surface is again exposed to the interior of body 8 to complete the heat treatment of the soil to the full depth. Other soil working tools may be used in addition or instead of the harrow 20, depending on the degree of loosening required.

As has been mentioned above, the burner of the present invention may serve not only as a soil steriliser and/or stubble burner. It is foreseen that the burner may be associated with a boiler to produce steam for heating, or to drive a turbine for electricity generation or to drive machinery directly via a mechanical transmission. Conventional boilers, heat exchangers, etc may be used to convert the heat energy from the combustion gases to the necessary medium for such uses.

We claim:

1. A stubble burning apparatus comprising a chassis capable of moving over an area of ground to be treated, a pick-up device to collect a swath of vegetable matter from the ground, a feed device to feed the vegetable matter to a chopper, and a blower to transport the vegetable matter to a combustion chamber of a burner, said combustion chamber having an upstream and a downstream end, said blower discharging air and cut vegetable matter into the upstream end of the combustion chamber, and wherein the stubble burning apparatus further comprises an igniter positioned at the upstream end of the combustion chamber, and a plurality of screens extending across the combustion chamber and spaced from each other in the flow direction, the mesh size of the screens decreasing in the flow direction, and wherein combustion gases from the burner are directed via a discharge device onto the surface of the ground.

2. A stubble burning apparatus according to claim 1, wherein the screens are so arranged that the total area of the openings in each screen is greater than the area of the openings in the adjacent upstream screen.

3. A stubble burning apparatus according to claim 2, wherein the blower is a combined chopper and blower, serving to comminute the vegetable matter and transport it entrained in a current of air into the combustion chamber.

4. A stubble burning apparatus according to claim 1, wherein the blower is a combined chopper and blower, serving to comminute the vegetable matter and transport it entrained in a current of air into the combustion chamber.

5. A stubble burning apparatus according to claim 1, wherein the discharge device has a downwardly-open bellshaped end.

6. A stubble burning apparatus according to claim 5, wherein the combustion chamber is substantially horizontal, and has its upstream end at the rear of the chassis relative to the direction of travel in operation.

7. A stubble burning apparatus according to claim 5, wherein the bellshaped end is situated within a downwardly-open body having a top surface and downwardly extending sides, the lower edges of said sides being substantially in contact with the ground.

8. A stubble burning apparatus according to claim 7, wherein the bellshaped end directs the combustion gases downwardly through a slot extending across the downwardly-open body intermediate its length.

9. A stubble burning apparatus according to claim 8, wherein the combustion chamber is substantially horizontal, and has its upstream end at the rear of the chassis relative to the direction of travel in operation.

10. A stubble burning apparatus according to claim 8, wherein a preheater is arranged to direct a heated jet over the cut vegetable matter before it passes to the blower.

11. A stubble burning apparatus according to claim 7, wherein a preheater is arranged to direct a heated jet over the cut vegetable matter before it passes to the blower.

12. A stubble burning apparatus according to claim 11, wherein the jet of the preheater is heated by air drawn through a duct in heat transfer communication with the body.

13. A stubble burning apparatus according to claim 12, wherein the body is of double-skin construction, and the preheater draws air from a space between the skins of the body.

14. A stubble burning apparatus according to claim 11, wherein the preheater draws air through a duct passing through the body.

15. A stubble burning apparatus according to claim 7, wherein the combustion chamber is substantially horizontal, and has its upstream end at the rear of the chassis relative to the direction of travel in operation.

16. A stubble burning apparatus according to claim 1, wherein the combustion chamber is substantially horizontal, and has its upstream end at the rear of the chassis relative to the direction of travel in operation.

17. A stubble burning apparatus according to claim 16, wherein a preheater is arranged to direct a heated jet over the cut vegetable matter before it passes to the blower.

18. A stubble burning apparatus according to claim 1, wherein the combustion chamber is arranged at an angle to the horizontal, and has its downstream end at the rear of the chassis relative to the direction of travel in operation.

19. A stubble burning apparatus according to claim 18, wherein a preheater is arranged to direct a heated jet over the cut vegetable matter before it passes to the blower.

* * * * *